(12) United States Patent
Kawakami et al.

(10) Patent No.: US 7,542,840 B2
(45) Date of Patent: Jun. 2, 2009

(54) DRIVING CONTROL APPARATUS AND METHOD HAVING A LANE KEEP FUNCTION AND A LANE DEPARTURE WARNING FUNCTION

(75) Inventors: Seiji Kawakami, Susono (JP); Satoru Niwa, Susono (JP); Katsuhiko Iwazaki, Numazu (JP); Hiroaki Kataoka, Susono (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 869 days.

(21) Appl. No.: 11/136,450

(22) Filed: May 25, 2005

(65) Prior Publication Data
US 2005/0273262 A1 Dec. 8, 2005

(30) Foreign Application Priority Data
Jun. 1, 2004 (JP) ............................ P2004-163405

(51) Int. Cl.
*B60W 30/12* (2006.01)
(52) U.S. Cl. ........................ 701/93; 701/301; 340/436
(58) Field of Classification Search ................... 701/301
See application file for complete search history.

(56) References Cited
U.S. PATENT DOCUMENTS

| 5,765,116 A | 6/1998 | Wilson-Jones et al. |
| 7,010,408 B2 | 3/2006 | Kitazawa et al. |
| 2002/0133285 A1 | 9/2002 | Hirasago |

FOREIGN PATENT DOCUMENTS

| CN | 1486879 A | 4/2004 |
| DE | 198 21 163 A1 | 11/1999 |
| EP | 0 640 903 A1 | 3/1995 |
| EP | 1 074 904 A1 | 2/2001 |

(Continued)

*Primary Examiner*—Thomas G Black
*Assistant Examiner*—Shelley Chen
(74) *Attorney, Agent, or Firm*—Oliff & Berridge, PLC (57) ABSTRACT

A driving control apparatus of the present invention has a driving road keeping device for providing a torque to a steering mechanism so as to keep a vehicle traveling at a predetermined position on a driving road; a driving road departure warning device for issuing a warning of a departure from the driving road on the basis of a position of the vehicle relative to the driving road; and a setting device for setting a need or no need for execution of a control of the driving road keeping device or the driving road departure warning device. Where the setting device sets a need for execution of the control, the control of the driving road keeping device is executed when an activation condition of the driving road keeping device is met and when a cruise control device is active. Where the setting device sets a need for execution of the control, the control of the driving road departure warning device is executed when the activation condition of the driving road keeping device is not met or when the cruise control device is inactive. According to the present invention, a lane departure warning function and a lane-keep assist function are selectively executed in conjunction with activation/deactivation of the cruise control device and the activation condition of the driving road keeping device, whereby, even with an automatic stop of operation of either one of the functions, the other function can prevent the vehicle from departing from the lane.

3 Claims, 5 Drawing Sheets

FOREIGN PATENT DOCUMENTS

| | | |
|---|---|---|
| EP | 1 087 360 A2 | 3/2001 |
| JP | A 07-104850 | 4/1995 |
| JP | A-2000-168395 | 6/2000 |
| JP | A 2001-010518 | 1/2001 |
| JP | A-2002-362395 | 12/2002 |
| JP | A-2003-191831 | 7/2003 |
| WO | WO 03/047900 A1 | 6/2003 |

Fig.2

| OPERATION STATUS OF LANE KEEPING DEVICE | LANE KEEP SWITCH | ACTIVATION CONDITIONS | | |
|---|---|---|---|---|
| | | OPERATION STATUS OF CRUISE CONTROL SYSTEM | WITHIN ACTIVATION PERMITTING SPEED RANGE OF LANE DEPARTURE WARNING FUNCTION | WITHIN ACTIVATION PERMITTING SPEED RANGE OF LANE-KEEP ASSIST FUNCTION |
| DEACTIVATION | OFF | INACTIVE | ○ | — |
| | ON | INACTIVE | × | — |
| ACTIVATION OF LANE DEPARTURE WARNING FUNCTION | ON | INACTIVE | ○ | — |
| | ON | ACTIVE | ○ | × |
| ACTIVATION OF LANE-KEEP ASSIST FUNCTION | ON | ACTIVE | — | ○ |

DRIVING CONTROL APPARATUS AND METHOD HAVING A LANE KEEP FUNCTION AND A LANE DEPARTURE WARNING FUNCTION

BACKGROUND OF THE INVENTION

1. Field of the Invention

The present invention relates to a driving control apparatus (method) having a lane keep function and a lane departure warning function.

2. Related Background of the Invention

A variety of driving control (support) apparatus (method) have been developed in order to support driver's driving. An example of the driving control apparatus is a lane keep system (lane keep function) of adding a steering force so as to keep a vehicle traveling near a center of a lane in order to support the driver's steering operation (Japanese Patent Application Laid-Open No. 7-104850). The lane keep system is configured to recognize a lane (white line) ahead the vehicle from a photographic image taken by a camera and to set a steering force to be added, based on a relative relation between the recognized lane and the vehicle. Another example of the driving control apparatus is a cruise control system for maintaining a vehicle speed set by the driver or for adding a braking force or a driving force to track a preceding vehicle, in order to support a driver's brake operation or acceleration operation. The cruise control system acquires information about the presence or absence of the preceding vehicle or a following distance from the preceding vehicle by use of a radar sensor or the like, sets the additional braking force or driving force to control the vehicle speed to the set speed, in the absence of the preceding vehicle, and sets the additional braking force or driving force so as to keep constant the following distance from the preceding vehicle, in the presence of the preceding vehicle.

SUMMARY OF THE INVENTION

There are vehicles provided with both of the lane keep system and the cruise control system, and in such vehicles there are cases where the lane keep system is automatically activated or deactivated in conjunction with an operating situation of the cruise control system. For this reason, where the cruise control system is deactivated by a driver's brake operation or switch operation, the lane keep system is also automatically deactivated in some cases. There are also situations in which the lane keep system side fails to continue the control, e.g., upon a failure in recognizing a lane from the photographic image taken by the camera. In such situations, in spite of the absence of the additional steering force by the lane keep system, the driver can believe that the addition of steering force by the lane keep system is ongoing. For this reason, there is a possibility that the driver falls behind in the steering operation and the vehicle approaches an edge of a lane to result in departing from the lane. An object of the present invention is therefore to provide a driving control apparatus for preventing a vehicle from departing from a driving road (particularly, a lane) upon deactivation of the lane keep system.

A driving control apparatus according to the present invention comprises driving road keeping means for providing a torque to a steering mechanism so as to keep a vehicle traveling at a predetermined position on a driving road; driving road departure warning means for issuing a warning of a departure from the driving road on the basis of a position of the vehicle relative to the driving road; and setting means for setting a need or no need for execution of a control of the driving road keeping means or the driving road departure warning means. Where the setting means sets a need for execution of the control, the control of the driving road keeping means is executed when an activation condition of the driving road keeping means is met and when cruise control means is active. The cruise control means is a means for controlling a driving force or speed of the vehicle so as to keep the vehicle in a predetermined driving state. Where the setting means sets a need for execution of the control, the control of the driving road departure warning means is executed when the activation condition of the driving road keeping means is not met or when the cruise control means is inactive.

This driving control apparatus has the driving road keeping means and the driving road departure warning means, and the setting means sets a need or no need for execution of the control of the driving road keeping means or the driving road departure warning means. The vehicle equipped with this driving control apparatus is also equipped with the cruise control means for controlling the driving force or speed of the vehicle so as to keep the vehicle in the predetermined driving state (e.g., driving at a vehicle speed set by the driver, or driving to track a preceding vehicle). In the driving control apparatus, where the setting means sets a need for execution of the control, which one of the controls of the driving road keeping means and the driving road departure warning means should be executed is determined in conjunction with whether the activation condition of the driving road keeping means is met or not and whether the cruise control means is active or not.

For this reason, where the setting means sets a need for execution of the control, the driving control apparatus determines whether the activation condition of the driving road keeping means is met and whether the cruise control means is active. When the activation condition of the driving road keeping means is met and when the cruise control means is active, the driving control apparatus executes the control of the driving road keeping means to provide a torque to the steering mechanism so as to keep the vehicle traveling at the predetermined position (e.g., near the center axis of the driving road (lane)) on the driving road (e.g., the lane on which the vehicle is traveling, or the road itself on which the vehicle is traveling, in the absence of the lane). The provision of this torque results in applying such a steering force as to keep the vehicle traveling within the driving road.

On the other hand, when the activation condition of the driving road keeping means is not met or when the cruise control means is inactive, the driving control apparatus executes the control of the driving road departure warning means to issue the warning of a departure from the driving road on the basis of the position of the vehicle relative to the driving road. This warning is issued for informing the driver that the vehicle can depart from the driving road, and is, for example, a warning by a sound such as a buzzer sound, a warning by a display such as a display on a display screen, a warning by addition of a steering force to the steering wheel by the vehicle, or the like. Therefore, it is feasible to draw driver's attention by this warning and to encourage the driver to perform such a steering operation as to avoid the departure from the driving road.

In this manner, the driving control apparatus automatically switches between the driving road keeping means and the driving road departure warning means in conjunction with whether the activation condition of the driving road keeping means is met or not and whether the cruise control means is active or not. For this reason, it is feasible to prevent the vehicle from departing from the driving road, by the driving road departure warning means even in the case where the driving road keeping means is automatically deactivated because of a failure in satisfying the activation condition of the driving road keeping means or because of deactivation of the cruise control means.

Preferably, the control of the driving road departure warning means is set to be executed when a vehicle speed of the vehicle (or a target vehicle speed of the cruise control means) is within an activation speed region of the driving road departure warning means. The activation speed region of the driving road departure warning means is set herein. Therefore, where the setting means sets a need for execution of the control, the driving control apparatus executes the control of the driving road departure warning means only when the vehicle speed of the vehicle (or the target speed of the cruise control means) is within the activation speed region of the driving road departure warning means, in a state in which the activation condition of the driving road keeping means is not met or in a state in which the cruise control means is inactive.

At low speeds, the vehicle runs in a mixed state of parked vehicles, bicycles, pedestrians, etc., and thus often travels across lanes, to cause frequent warnings. At high speeds, the driver performs a delicate operation and a warning can be a disturbance against the driver's operation. For this reason, the driving road departure warning means is configured to be activated in the activation speed region. By setting the vehicle speed region in which the driving road departure warning means is activated, the warning becomes useful to the driver.

Preferably, an occasion in which the cruise control means is inactive is an occasion in which a setting switch for setting a need or no need for activation of the cruise control means is off (inactive). In this configuration, the vehicle is provided with the switch for setting a need or no need for activation of the cruise control means. When this setting switch is off, the cruise control means is not activated, so that the control of the driving road keeping means is not executed in the driving control apparatus.

Preferably, an occasion in which the cruise control means is inactive is an occasion in which a target speed of the cruise control means is off the activation speed region. In this configuration, the activation vehicle region is set relative to the target speed in the cruise control means. When the target speed is off the activation speed region, the cruise control means is not activated, so that the control of the driving road keeping means is not executed in the driving control apparatus. In passing, the cruise control is not suitable for use under complicated traffic conditions such as urban areas where low-speed driving is anticipated, and a speed limit is set in the high speed region. For this reason, the activation speed region is set in the cruise control means. This enables the control of the vehicle in a stable driving state.

Preferably, an occasion in which the activation condition of the driving road keeping means is not met is an occasion in which the vehicle speed of the vehicle (or the target speed of the cruise control means) is off an activation speed region of the driving road keeping means. The activation speed region of the driving road keeping means is set herein. Therefore, where the setting means sets a need for execution of the control, the driving control apparatus executes the control of the driving road keeping means when the vehicle speed of the vehicle (or the target speed of the cruise control means) is within the activation speed region of the driving road keeping means and when the cruise control means is active; the driving control apparatus executes the control of the driving road departure warning means when the vehicle speed is off the activation speed region of the driving road keeping means. The stable driving road keeping function is achieved when the driving road keeping means is activated in the vehicle speed region in which it is expected that the driving circumstances are almost constant with few complicated road shapes. For this reason, the activation speed region is set in the driving road keeping means.

A driving control method according to the present invention for performing a driving road keeping control for providing a torque to a steering mechanism so as to keep a vehicle traveling at a predetermined position on a driving road or a driving road departure warning control for issuing a warning of a departure from the driving road on the basis of a position of the vehicle relative to the driving road. And further a need or no need for execution of the driving road keeping control or the driving road departure warning control is set. Where a need for execution of either control, the driving road keeping control is executed when an activation condition of the driving road keeping control is met and when cruise control is active. The cruise control controls a driving force or speed of the vehicle so as to keep the vehicle in a predetermined driving state. Where a need for execution of either control, the driving road departure warning control is executed when the activation condition of the driving road keeping control is not met or when the cruise control is inactive.

With this driving control method, a need or no need for execution of the driving road keeping control or the driving road departure warning control is set. With this driving control method, the cruise control is also performed for controlling the driving force or speed of the vehicle so as to keep the vehicle in the predetermined driving state (e.g., driving at a vehicle speed set by the driver, or driving to track a preceding vehicle). Where a need for execution of either control is set, which the driving road keeping control or the driving road departure warning control should be executed is determined in conjunction with whether the activation condition of the driving road keeping control is met or not and whether the cruise control is active or not.

For this reason, where a need for execution of either control, it is determined whether the activation condition of the driving road keeping control is met and whether the cruise control is active. When the activation condition of the driving road keeping control is met and when the cruise control is active, the control of the driving road keeping control is executed to provide a torque to the steering mechanism so as to keep the vehicle traveling at the predetermined position (e.g., near the center axis of the driving road (lane)) on the driving road (e.g., the lane on which the vehicle is traveling, or the road itself on which the vehicle is traveling, in the absence of the lane). The provision of this torque results in applying such a steering force as to keep the vehicle traveling within the driving road.

On the other hand, when the activation condition of the driving road keeping control is not met or when the cruise control is inactive, the control of the driving road departure warning control is executed to issue the warning of a departure from the driving road on the basis of the position of the vehicle relative to the driving road. This warning is issued for informing the driver that the vehicle can depart from the driving road, and is, for example, a warning by a sound such as a buzzer sound, a warning by a display such as a display on a display screen, a warning by addition of a steering force to the steering wheel by the vehicle, or the like. Therefore, it is feasible to draw driver's attention by this warning and to encourage the driver to perform such a steering operation as to avoid the departure from the driving road.

In this manner, with the driving control method, the driving road keeping control and the driving road departure warning control are automatically switched in conjunction with whether the activation condition of the driving road keeping control is met or not and whether the cruise control is active or not. For this reason, it is feasible to prevent the vehicle from departing from the driving road, by the driving road departure warning control even in the case where the driving road keeping control is automatically deactivated because of a failure in satisfying the activation condition of the driving road keeping control or because of deactivation of the cruise control.

Preferably, the control of the driving road departure warning control is set to be executed when a vehicle speed of the vehicle (or a target vehicle speed of the cruise control) is within an activation speed region of the driving road departure warning control. The activation speed region of the driving road departure warning contorol is set herein. Therefore, where a need for execution of either control, the driving road departure warning contorol is executed only when the vehicle speed of the vehicle (or the target speed of the cruise control) is within the activation speed region of the driving road departure warning contorol, in a state in which the activation condition of the driving road keeping control is not met or in a state in which the cruise control is inactive.

At low speeds, the vehicle runs in a mixed state of parked vehicles, bicycles, pedestrians, etc., and thus often travels across lanes, to cause frequent warnings. At high speeds, the driver performs a delicate operation and a warning can be a disturbance against the driver's operation. For this reason, the driving road departure warning means is configured to be activated in the activation speed region. By setting the vehicle speed region in which the driving road departure warning means is activated, the warning becomes useful to the driver.

Preferably, an occasion in which the cruise control is inactive is an occasion in which a setting switch for setting a need or no need for activation of the cruise control is off (inactive). In this configuration, the vehicle is provided with the switch for setting a need or no need for activation of the cruise control. When this setting switch is off, the cruise control is not activated, so that the driving road keeping contorol is not executed.

Preferably, an occasion in which the cruise control is inactive is an occasion in which a target speed of the cruise control is off the activation speed region. In this configuration, the activation vehicle region is set relative to the target speed in the cruise control. When the target speed is off the activation speed region, the cruise control is not activated, so that the driving road keeping contorol is not executed. In passing, the cruise control is not suitable for use under complicated traffic conditions such as urban areas where low-speed driving is anticipated, and a speed limit is set in the high speed region. For this reason, the activation speed region is set in the cruise control. This enables the control of the vehicle in a stable driving state.

Preferably, an occasion in which the activation condition of the driving road keeping contorol is not met is an occasion in which the vehicle speed of the vehicle (or the target speed of the cruise control) is off an activation speed region of the driving road keeping contorol. The activation speed region of the driving road keeping contorol is set herein. Therefore, where a need for execution of either control, the driving road keeping control is executed when the vehicle speed of the vehicle (or the target speed of the cruise control) is within the activation speed region of the driving road keeping contorol and when the cruise control is active; the driving road departure warning contorol is executed when the vehicle speed is off the activation speed region of the driving road keeping contorol. The stable driving road keeping function is achieved when the driving road keeping contorol is activated in the vehicle speed region in which it is expected that the driving circumstances are almost constant with few complicated road shapes. For this reason, the activation speed region is set in the driving road keeping contorol.

DESCRIPTION OF THE PREFERRED EMBODIMENTS

An embodiment of the driving control apparatus (method) according to the present invention will be described below with reference to the drawings. In the present embodiment, the driving control apparatus according to the present invention is applied to a lane keeping device mounted on a vehicle equipped with a cruise control system. The lane keeping device according to the present embodiment has a lane departure warning function and a lane-keep assist function, and is configured to select one of the two functions by a lane keep switch. When the lane keep switch is turned on through a driver's operation, it is determined whether the present driving state is a state in which the lane departure warning function should be activated or a state in which the lane-keep assist function should be activated, and a control is carried out based on the determination. The lane keep switch is one for detecting which one of the lane departure warning function and the lane-keep assist function the driver selected (set) to activate.

Figure 1:
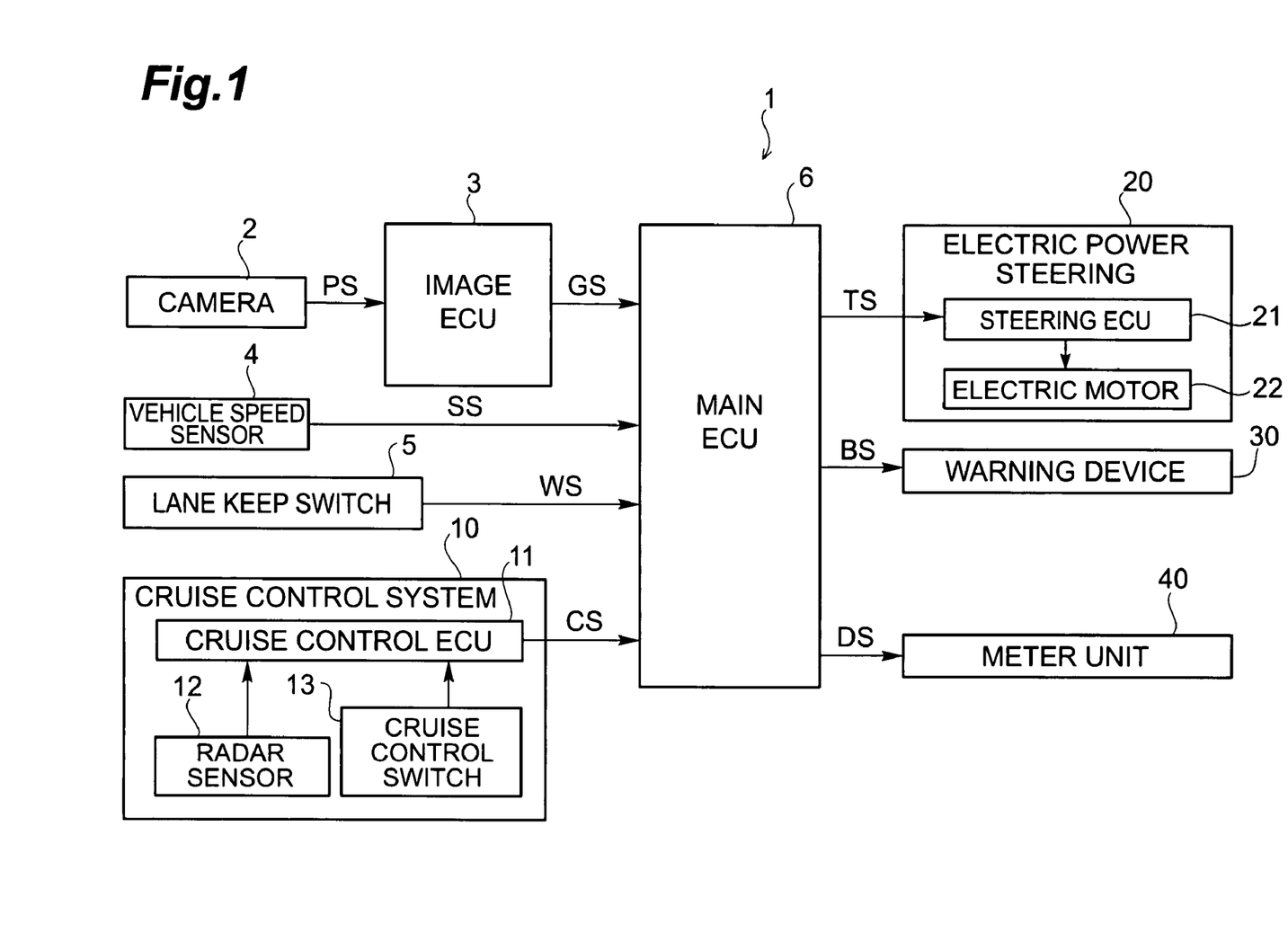
FIG. 1 is a configuration diagram of a lane keeping device according to an embodiment of the present invention.
Figure 2:
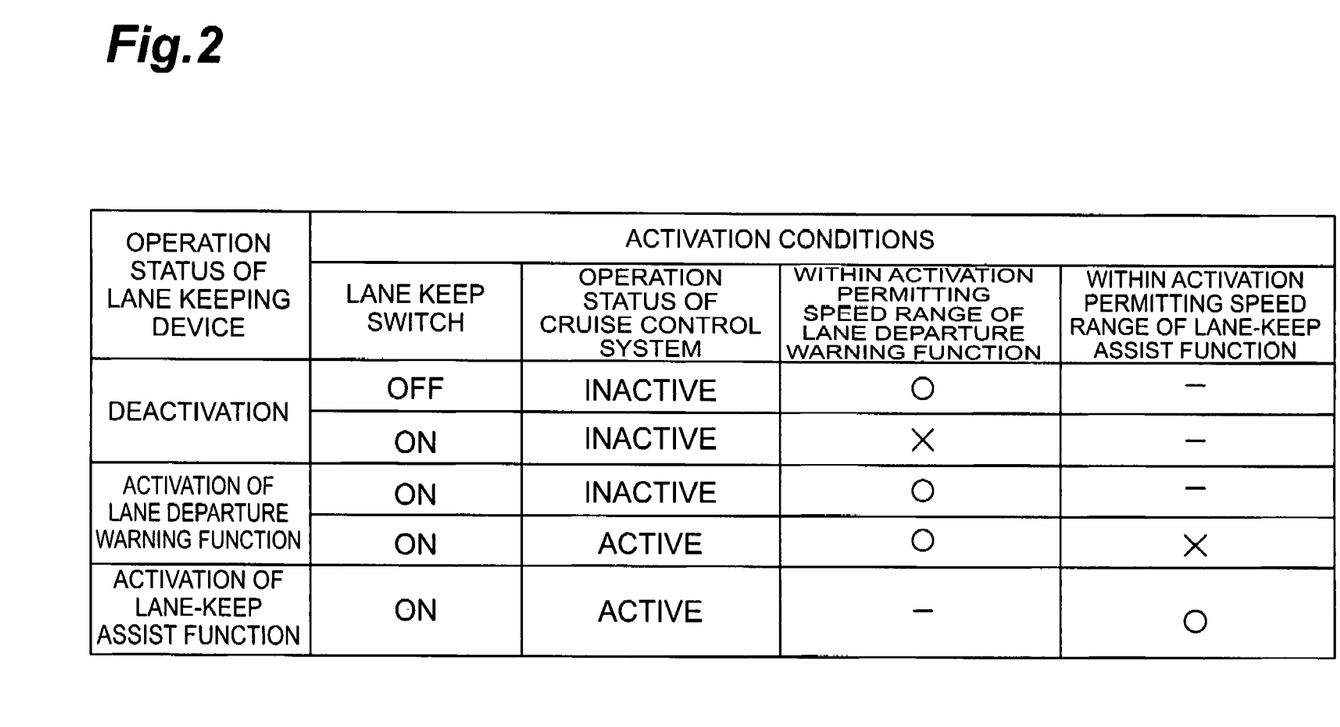
FIG. 2 is a table showing activation conditions of a lane departure warning function and a lane-keep assist function in the lane keeping device of FIG. 1.
Figure 3:
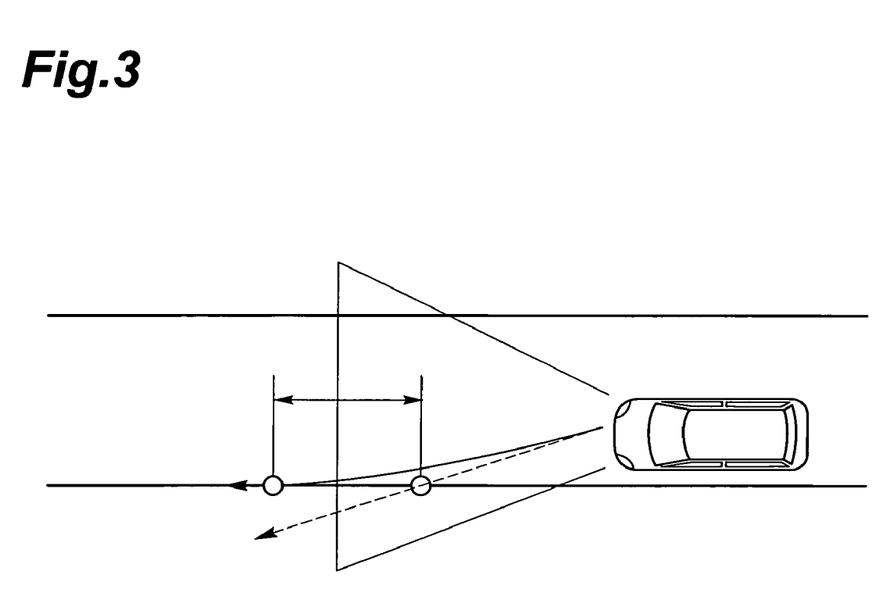
FIG. 3 is a drawing to illustrate the lane departure warning function in the lane keeping device of FIG. 1.
Figure 4:
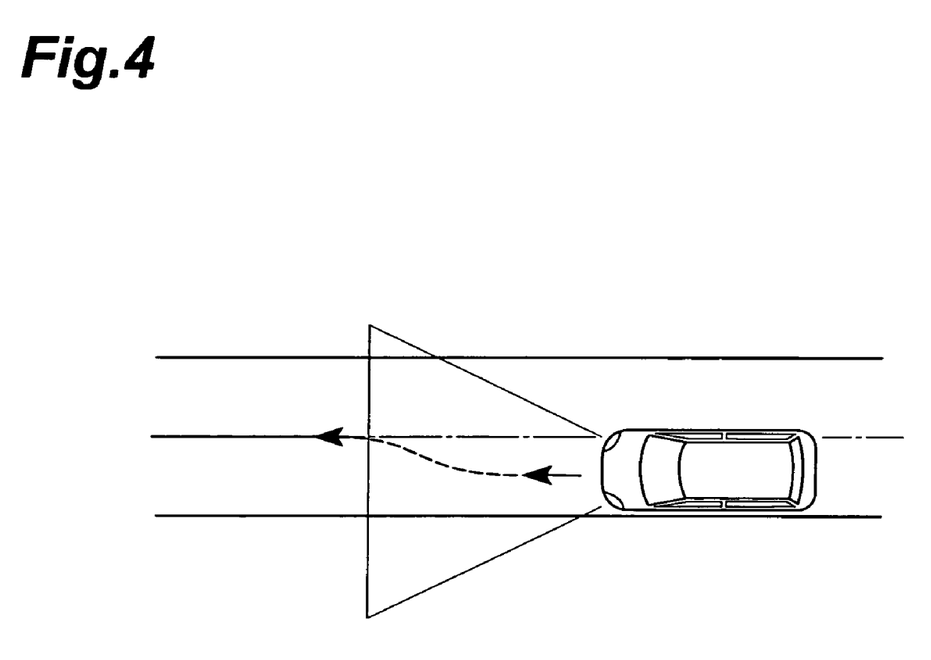
FIG. 4 is a drawing to illustrate the lane-keep assist function in the lane keeping device of FIG. 1.

The configuration of the lane keeping device 1 will be described with reference to FIGS. 1 to 4. FIG. 1 is a configuration diagram of the lane keeping device according to the present embodiment. FIG. 2 is a table showing the activation conditions of the lane departure warning function and the lane-keep assist function in the lane keeping device of FIG. 1. FIG. 3 is a drawing to illustrate the lane departure warning function in the lane keeping device of FIG. 1. FIG. 4 is a drawing to illustrate the lane-keep assist function in the lane keeping device of FIG. 1.

The lane keeping device 1 has the lane departure warning function of issuing various warnings with possibilities of a departure of the vehicle from a lane, and the lane-keep assist function of adding such a steering force as to keep the vehicle running near the center of the lane, in order to assist driving by the driver. When the lane keep switch is on, the lane keeping device 1 activates either one of the two functions, based on on/off of the cruise control system and the vehicle speed. Particularly, the lane keeping device 1 activates the lane departure warning function even with deactivation of the lane-keep assist function, in order to prevent the vehicle from departing from the lane even with deactivation of the lane-keep assist function. For that, the lane keeping device 1 has a camera 2, an image ECU [Electronic Control Unit] 3, a vehicle speed sensor 4, a lane keep switch 5, and a main ECU 6, and transmits and receives various signals to and from a cruise control system 10, an electric power steering 20, a warning device 30, and a meter unit 40.

The cruise control system 10 controls a brake actuator (not shown) and a throttle actuator (not shown) through cruise control ECU 11, and automatically adjusts the vehicle speed so as to keep the vehicle traveling at a vehicle speed set by the driver. The cruise control system 10 detects the presence/absence of a preceding vehicle, a following distance from a preceding vehicle, and so on by use of a radar sensor 12, and, where a preceding vehicle exists ahead the vehicle, the cruise control ECU 11 automatically adjusts the vehicle speed or acceleration so as to track the preceding vehicle.

The cruise control system 10 is activated or deactivated by a driver's on or off operation on the cruise control switch 13, and the set vehicle speed is determined by a driver's setting operation on the cruise control switch 13. An activation permitting speed range is set for the set vehicle speed and the cruise control system 10 is activated only when the set vehicle speed is set within the activation permitting speed range (i.e., when the set vehicle speed is not less than V5 and not more than V6). The cruise control ECU 11 transmits to main ECU 6, information about on/off of the cruise control system 10 and information of the vehicle speed set by the driver in the form of a cruise control signal CS.

The cruise control system 10 can be deactivated by a driver's brake operation, a failure, or the like even if the cruise control switch 13 is on. In addition, since the cruise control system 10 is permitted to be activated within the activation permitting speed range, the operation thereof is terminated if the actual vehicle speed falls off the activation permitting speed range during execution of the cruise control. The reason why the activation permitting speed range is set for the cruise control system 10 is that it is not suitable for use in complicated traffic circumstances such as urban areas in which low-speed driving is anticipated, and that a speed limit is defined in the high speed region. The provision of this activation permitting speed range enables the cruise control in a stable driving state.

The electric power steering 20 controls an electric motor 22 through steering ECU 21 to assist a driver's steering operation by a driving force of the electric motor 22. The steering ECU 21 sets an assist amount based on a steering wheel torque given by a driver's steering operation and controls the driving of the electric motor 22 according to the assist amount. Particularly, when receiving a steering torque signal TS from main ECU 6, the steering ECU 21 sets the assist amount by adding a steering torque to be provided through the control by the lane keeping device 1 (a steering force indicated by the steering torque signal TS), to the steering wheel torque caused by the driver's steering operation.

The warning device 30 outputs a buzzer sound as a warning to the driver. When receiving a buzzer signal BS from main ECU 6, the warning device 30 issues a buzzer sound according to the buzzer signal BS. The meter unit 40 is provided with a multi-display (not shown), in addition to various meters and warning indicators. The multi-display displays operation situations of the lane keeping device 1 and the cruise control system 10. When receiving a display signal DS from main ECU 6, the meter unit 40 displays the operation situation of the lane keeping device 1 according to the display signal DS on the multi-display.

The camera 2 is, for example, a CMOS [Complimentary Metal Oxide Semiconductor] camera, and is mounted in the front part of the vehicle equipped with the lane keeping device 1. On this occasion, the camera 2 is mounted so that the direction of its optical axis agrees with the traveling direction of the vehicle. The camera 2 takes an image of a road ahead the vehicle to acquire a color image thus taken (e.g., an image of RGB [Red Green Blue]). The camera 2 transmits data of the photographic image as a photograph signal PS to image ECU 3. The camera 2 has a wide image field in the lateral directions, and is able to well photograph (a pair of) white lines on the left and right sides indicating a traveling lane. The camera 2 is a color camera, but it may be a monochrome camera as long as it can acquire an image that permits recognition of a white line on a road.

The image ECU 3 is comprised of a CPU [Central Processing Unit], a ROM [Read Only Memory], a RAM [Random Access Memory], and so on. The image ECU 3 retrieves the photograph signal PS, and recognizes a pair of white lines indicating a lane on which the vehicle is traveling, from the photographic image data of the photograph signal PS. Then the image ECU 3 calculates the width of the lane, a line passing the center between the pair of white lines (i.e., the center line of the lane), and the radius of curvature and the curvature of the center line from the pair of white lines recognized. Furthermore, the image ECU 3 calculates an angular difference between the center line of the lane and the direction in which the camera 2 is directed (i.e., the traveling direction of the vehicle), and an offset amount of the vehicle from the center line of the lane. Then the image ECU 3 transmits to the main ECU 6, the information of the pair of white lines recognized and each calculated information as an image signal GS.

The vehicle speed sensor 4 is a sensor for detecting the speed of the vehicle on the basis of rotational speeds of wheels or the like. The vehicle speed sensor 4 transmits the detected vehicle speed information as a vehicle speed signal SS to main ECU 6. The lane keep switch 5 is a switch for selecting (or setting) activation/deactivation of the lane keeping device 1 through a driver's operation. The lane keep switch 5 transmits information about on/off selected by the driver, as a switch signal WS to main ECU 6.

The main ECU 6 is comprised of a CPU, a ROM, a RAM, and so on. The main ECU 6 retrieves the image signal GS from the image ECU 3, the vehicle speed signal SS from the vehicle speed sensor 4, the switch signal WS from the lane keep switch 5, and the cruise control signal CS from the cruise control system 10 (cruise control ECU 11). Then the main ECU 6 determines activation/deactivation of the lane departure warning function and the lane-keep assist function, and, where either of the functions is activated, the main ECU 6 executes the control of the function. Furthermore, the main ECU 6 sets the various signals TS, BS, and DS according to the function in execution of the control and transmits the various signals TS, BS, DS to the electric power steering 20 (steering ECU 21), the warning device 30, and the meter unit 40.

A process of determining activation/deactivation of the lane departure warning function and the lane-keep assist function in the main ECU 6 will be described below with reference to FIG. 2. The main ECU 6 determines whether the lane keep switch 5 is on, based on the switch signal WS. When the lane keep switch 5 is off, the main ECU 6 deactivates the lane keeping device 1. When the lane keep switch 5 is on, the main ECU 6 determines whether the cruise control system 10 is active, based on the cruise control signal CS.

When the cruise control system 10 is inactive, the main ECU 6 determines whether the vehicle speed V is within an activation permitting speed range of the lane departure warning function (i.e., whether the vehicle speed V is not less than V1 and not more than V2), based on the vehicle speed signal SS. When the vehicle speed V is off the activation permitting speed range of the lane departure warning function (i.e., when the vehicle speed V is less than V1 or higher than V2), the main ECU 6 deactivates the lane keeping device 1. On the other hand, when the vehicle speed V is within the activation permitting speed range of the lane departure warning function (i.e., when the vehicle speed is not less than V1 and not more than V2), the main ECU 6 activates the lane departure warning function.

When the cruise control system 10 is active, the main ECU 6 determines whether the set vehicle speed Vset of the cruise control system 10 is within an activation permitting speed range of the lane-keep assist function (i.e., whether the vehicle speed Vset is not less than V3 and not more than V4). In passing, where the cruise control system 10 is active, the vehicle is automatically adjusted so that the vehicle speed V becomes the set vehicle speed Vset, and, therefore, a determination is made using the set vehicle speed Vset herein. The foregoing determination may be made using the actual vehicle speed V from the vehicle speed signal SS, instead of the set vehicle speed Vset of the cruise control system 10. In addition, the determination may also be made based on whether the set vehicle speed Vset and the actual vehicle speed V both are within the activation permitting speed range of the lane-keep assist function. However, V1<V3 and V4<V2; therefore, the activation permitting speed range of the lane-keep assist function is a vehicle speed range included in the activation permitting speed range of the lane departure warning function. In addition, there is the following relations with the activation permitting speed range of the set speed of the cruise control system 10 (the set vehicle speed Vset is not less than V5 and not more than V6); V5<V1<V3 and V6=V4<V2.

When the set vehicle speed Vset is off the activation permitting speed range of the lane-keep assist function (i.e., when the vehicle speed Vset is less than V3 or higher than V4), the main ECU 6 determines whether the set vehicle speed Vset is within the activation permitting speed range of the lane departure warning function, based on the cruise control signal CS. When the set vehicle speed Vset is off the activation permitting speed range of the lane departure warning function, the main ECU 6 deactivates the lane keeping device 1. The determination herein is also made using the set vehicle speed Vset, but the determination may also be made using the actual vehicle speed V from the vehicle speed signal SS. In addition, the determination may also be made based on whether the set vehicle speed Vset and the actual vehicle speed V both are within the activation permitting speed range of the lane-keep assist function. When the set vehicle speed Vset is within the activation permitting speed range of the lane departure warning function, the main ECU 6 activates the lane departure warning function. On the other hand, when the set vehicle speed is within the activation permitting speed range of the lane-keep assist function (i.e., when the vehicle speed is not less than V3 and not more than V4), the main ECU 6 activates the lane-keep assist function.

Therefore, the lane keeping device 1 is activated when the lane keep switch 5 is on and when the vehicle speed V is within the activation permitting speed range of the lane departure warning function. The lane-keep assist function is activated only when the cruise control system 10 is active and when the set vehicle speed Vset of the cruise control system 10 is within the activation permitting speed range of the lane-keep assist function, in a state in which the lane keeping device 1 is active. On the other hand, the lane departure warning function is activated only when the lane-keep assist function is inactive, in a state in which the lane keeping device 1 is active. Therefore, even in the state where the lane-keep assist function is active, when the cruise control system 10 is deactivated, the lane-keep assist function is terminated and the lane departure warning function is activated. Even in the state where the lane-keep assist function is active, when the set vehicle speed Vset of the cruise control system 10 becomes off the activation permitting speed range of the lane-keep assist function, the lane-keep assist function is terminated and the lane departure warning function is activated.

The main ECU 6 sets a display signal DS indicating information about activation/deactivation of each function, on/off of the lane keep switch 5, able/unable status of recognition of a white line in the image ECU 3, etc., and transmits the display signal DS to the meter unit 40. In passing, in a case where the image ECU 3 is unable to recognize a white line even with the lane keep switch 5 being on, the effect by each function cannot be achieved even with activation of the lane departure warning function and the lane-keep assist function, and, therefore, neither of the lane departure warning function and the lane-keep assist function is activated.

The lane departure warning function is not activated in the vehicle speed region of less than V1 (low speed region) for the following reason: the vehicle travels in a mixed state of parked vehicles, bicycles, pedestrians, etc. at low speeds and often runs across lanes, and a warning is prevented from being outputted in this situation. This prevents an unwanted warning from being frequently outputted. The lane departure warning function is not activated in the speed region of more than V2 (high speed region) for the following reason: a warning is prevented from becoming a disturbance to the driver under a delicate operation at high speeds. The lane-keep assist function is provided with the activation permitting speed range for the following reason: if it is activated in a speed region in which the vehicle is expected to travel in a driving state in which the driving circumstances possibly become almost constant with few complicated road shapes (i.e., within the activation permitting speed range), it is feasible to provide a stable lane-keep assist.

The processing in the main ECU 6 under execution of the control of the lane departure warning function will be described with reference to FIG. 3. The lane departure warning function determines whether the vehicle can depart from the lane, on the basis of the relative positional relation between the vehicle and the lane (a pair of white lines) during driving of the vehicle. When it is determined that the vehicle can depart from the lane, the lane departure warning function performs addition of a steering force at a body-sensory warning level by use of the electric power steering 20, issue of a buzzer sound from the warning device 30, and display of a warning indication on the multi-display of the meter unit 40, in order to encourage the driver to perform a steering operation for avoiding a departure from the lane.

The steering force at the body-sensory warning level is a small steering force enough to make the driver aware that the steering force toward the center of the lane is added (the steering force added to the steering wheel by the vehicle). This steering force is of a predetermined small magnitude and is added only for a predetermined short time. In FIG. 3, a dashed arrow indicates a vehicular swept path of the vehicle without addition of the steering force, and a solid arrow a vehicular swept path of the vehicle with addition of the steering force by the lane departure warning function. The provision of this small steering force defers the departure of the vehicle from the lane, and during this period of delay the vehicle can be returned to the center in the lane through a driver's steering operation.

For that purpose, the main ECU 6 determines whether the vehicle can depart from the lane, based on the relative relation between the direction in which the camera 2 is directed (i.e., the traveling direction of the vehicle) and the direction of the pair of white lines (or the center line of the lane), in consideration of the radius of curvature of the center line of the lane and the width of the lane on the basis of the image signal GS. The main ECU 6 also determines a steering direction of the steering force to be added, based on the direction of the camera 2 and the direction of the pair of white lines.

When it is determined that the vehicle can depart from the lane, the main ECU 6 sets a steering torque signal TS indicating a steering torque for generation of the steering force at the body-sensory warning level (the steering direction of which is the direction determined), and transmits the steering torque signal TS to the electric power steering 20 (steering ECU 21). The main ECU 6 also sets a buzzer signal BS for outputting a buzzer sound from the warning device 30, and transmits the buzzer signal BS to the warning device 30. Furthermore, the main ECU 6 sets a display signal DS for displaying a warning on the multi-display of the meter unit 40, and transmits the display signal DS to the meter unit 40.

The processing in the main ECU 6 under execution of the control of the lane-keep assist function will be described with reference to FIG. 4. The lane-keep assist function adds a steering force to the steering system by use of the electric power steering 20 so as to keep the vehicle traveling near the center of the lane. This steering force is a relatively small steering force enough to assist the steering force given by the driver, and is set according to the radius of curvature of the lane, the angular difference between the vehicle and the center line of the lane, and the offset amount. Since the added steering force is the small steering force enough to assist the driver's steering force, the vehicle can depart from the lane, depending upon the driver's steering force.

When it is determined that the vehicle cannot keep traveling within the lane, the lane-keep assist function thus performs issue of a buzzer sound from the warning device 30 and display of a warning on the multi-display of the meter unit 40. In FIG. 4, a dashed arrow indicates a vehicular swept path of the vehicle in the case where the steering force by the lane-keep assist function is added. In this case, the vehicle, having been traveling near an edge of the lane, comes to run near the center line (chain line) of the lane with the addition of the steering force to the right. On this occasion, the steering force by the driver's steering operation also acts on the vehicle.

For that purpose, the main ECU 6 calculates the magnitude of the added steering torque and the steering direction, based on the angular difference of the direction of the camera 2 (i.e., the traveling direction of the vehicle) relative to the center line of the lane, the offset amount of the vehicle from the center line of the lane, and the curvature of the lane, on the basis of the image signal GS. On this occasion, the added steering torque becomes larger with increase in the angular difference, the offset amount, and the curvature. In calculating the magnitude of the steering torque, the angular difference, the offset amount, and the curvature are multiplied by their respective gains, and the added steering torque becomes larger with increase in the gains. By increasing each of the gains, therefore, it becomes feasible to make the vehicle travel near the center of the lane, without the driver's steering force. The main ECU 6 sets a steering torque signal TS indicating the steering torque determined by the calculation, and transmits the steering torque signal TS to the electric power steering 20 (steering ECU 21).

The main ECU 6 determines whether the vehicle can keep traveling within the lane, from the relative relation between the direction of the camera 2 and the direction of the pair of white lines, in consideration of the radius of curvature of the center line of the lane and the width of the lane on the basis of the image signal GS. When it is determined that the vehicle cannot keep traveling within the lane, the main ECU 6 sets a buzzer signal BS for outputting a buzzer sound from the warning device 30, and transmits the buzzer signal BS to the warning device 30. The main ECU 6 also sets a display signal DS for providing a warning indication on the multi-display of the meter unit 40, and transmits the display signal DS to the meter unit 40.

Figure 5:
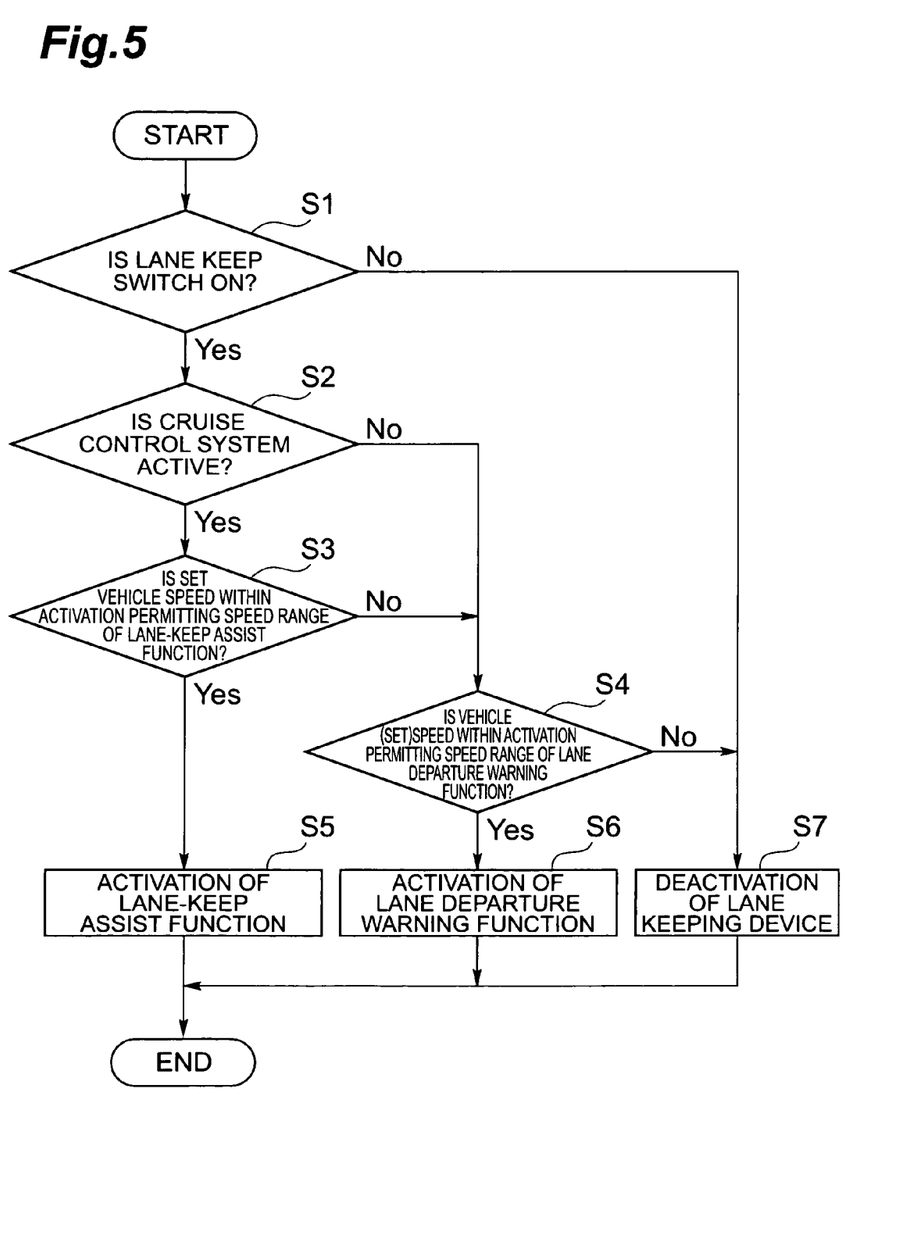
FIG. 5 is a flowchart showing a flow of a process of determining activation/deactivation of the lane departure warning function and the lane-keep assist function in a main ECU of FIG. 1.

The operation of the lane keeping device 1 will be described with reference to FIG. 1. Particularly, the process for the main ECU 6 to determine activation/deactivation will be described along the flowchart of FIG. 5. FIG. 5 is a flowchart showing the flow of the process of determining activation/deactivation of the lane departure warning function and the lane-keep assist function in the main ECU of FIG. 1.

The camera 2 takes an image of a road ahead the vehicle and transmits data of the photographic image as a photograph signal PS to the image ECU 3. The image ECU 3 recognizes a pair of white lines defining a lane, from the photographic image. Then the image ECU 3 calculates the lane width, the center line of the lane, and the radius of curvature and the curvature of the center line from the pair of white lines, and calculates the angular difference between the center line of the lane and the direction of the camera 2 and the offset amount of the vehicle from the center line of the lane. Furthermore, the image ECU 3 transmits these information about the pair of white lines and information items obtained by the calculation, as an image signal GS to the main ECU 6. The vehicle speed sensor 4 detects vehicle speed information and transmits the vehicle speed information as a vehicle speed signal SS to the main ECU 6. The lane keep switch 5 transmits information of on/off thereof as a switch signal WS to the main ECU 6.

The cruise control ECU 11 transmits to the main ECU 6, information of activation/deactivation (on/off) of the cruise control system 10 and information of the vehicle speed set by the driver as a cruise control signal CS. The main ECU 6 determines whether the lane keep switch 5 is on, based on the switch signal WS (step 1). When it is determined at step 1 that the lane keep switch 5 is off, the main ECU 6 terminates the operation of the lane keeping device 1 (step 7). When it is determined at step 1 that the lane keep switch 5 is on, the main ECU 6 determines whether the cruise control system 10 is active, based on the cruise control signal CS (step 2).

It is determined at step 2 that the cruise control system 10 is active, the main ECU 6 determines whether the set vehicle speed is within the activation permitting speed range of the lane-keep assist function, based on the cruise control signal CS (step 3). It is determined at step 3 that the set vehicle speed is within the activation permitting speed range of the lane-keep assist function, the main ECU 6 activates the lane-keep assist function (step 5). The lane-keep assist function may be activated under the condition that the set vehicle speed and the actual vehicle speed both are within the activation permitting speed range of the lane-keep assist function at step 3.

On the other hand, when it is determined at step 3 that the set vehicle speed is off the activation permitting speed range of the lane-keep assist function, the main ECU 6 determines whether the set vehicle speed is within the activation permitting speed range of the lane departure warning function, based on the cruise control signal CS (step 4). When it is determined at step 4 that the set vehicle speed is within the activation permitting speed range of the lane departure warning function, the main ECU 6 activates the lane departure warning function (step 6). On the other hand, when it is determined at step 4 that the set vehicle speed is off the activation permitting speed range of the lane departure warning function, the main ECU 6 terminates the operation of the lane keeping device 1 (step 7).

When it is determined at step 2 that the cruise control system 10 is inactive (deactivated), the main ECU 6 determines whether the actual vehicle speed is within the activation permitting speed range of the lane departure warning function, based on the vehicle speed signal SS (step 4). When it is determined at step 4 that the vehicle speed is within the activation permitting speed range of the lane departure warning function, the main ECU 6 activates the lane departure warning function (step 6). When it is determined at step 4 that the vehicle speed is off the activation permitting speed range of the lane departure warning function, the main ECU 6 terminates the operation of the lane keeping device 1 (step 7).

When the lane departure warning function is activated, the main ECU 6 determines whether the vehicle can depart from the lane, based on the image signal GS. When it is determined that the vehicle can depart from the lane, the main ECU 6 transmits to the steering ECU 21 the steering torque signal TS indicating the steering torque for generation of the steering force at the body-sensory warning level. In addition, the main ECU 6 transmits the buzzer signal BS for issue of a buzzer sound, to the warning device 30, and transmits the display signal DS for display of a warning on the multi-display of the meter unit 40, to the meter unit 40.

The electric power steering 20 sets an assist amount by adding the steering torque indicated by the steering torque signal TS, to the driver's steering torque, and drives the electric motor 22 in accordance with the assist amount. Then the small steering force by the control of the lane keeping device 1 acts on the vehicle for a short period of time to direct the vehicle slightly toward the center of the lane. The warning device 30 issues a buzzer sound. Furthermore, the meter unit 40 displays a warning on the multi-display. As a result, the driver becomes aware that the vehicle can depart from the lane, by virtue of the steering force at the body-sensory warning level, the buzzer sound, or the warning display.

When the lane-keep assist function is activated, the main ECU 6 calculates the magnitude and direction of the steering torque added for making the vehicle travel near the center of the lane, based on the image signal GS. Then the main ECU 6 transmits the steering torque signal TS indicating the steering torque determined by the calculation, to the steering ECU 21. The electric power steering 20 sets an assist amount by adding the steering torque indicated by the steering torque signal TS, to the driver's steering torque, and drives the electric motor 22 in accordance with the assist amount. Then the relatively small steering force by the control of the lane keeping device 1 continuously acts on the vehicle, whereby the vehicle is continuously directed toward the center of the lane.

The main ECU 6 determines whether the vehicle can keep traveling within the lane, based on the image signal GS. When it is determined that the vehicle cannot keep traveling within the lane, the main ECU 6 transmits the buzzer signal BS for issue of a buzzer sound to the warning device 30 and transmits the display signal DS for display of a warning on the multi-display of the meter unit 40, to the meter unit 40. The warning device 30 issues a buzzer sound. Furthermore, the meter unit 40 displays a warning on the multi-display. As a result, the driver becomes aware that the vehicle cannot keep traveling within the lane, by virtue of the buzzer sound or the warning display.

This lane keeping device 1 is configured to automatically switch between the lane departure warning function and the lane-keep assist function in conjunction with activation/deactivation of the cruise control system 10 and change of the vehicle speed; therefore, even if the operation of either one of the functions is automatically terminated, the other function can prevent the vehicle from departing from the lane. Particularly, even if the addition of the steering force by the lane-keep assist function is disabled, when the vehicle is about to depart from the lane, the driver becomes aware of the departure in the early stage by virtue of the various warnings given by the lane departure warning function. As a result, the vehicle can keep traveling within the lane through the driver's steering operation.

Since the lane keeping device 1 is configured to automatically switch between the lane departure warning function and the lane-keep assist function in conjunction with activation/deactivation of the cruise control system 10 and change of the vehicle speed, it is feasible to implement activation and deactivation of the two functions by an operation on one lane keep switch 5. This simplifies the switch configuration on the vehicle side and also facilitates the driver's switching operation.

The embodiment according to the present invention was described above, but the present invention can be carried out in various forms without being limited to the above embodiment. For example, the present embodiment was configured to inform the driver of the possibility of a departure from the lane by the addition of the steering force at the body-sensory warning level, the issue of the buzzer sound, and the warning display when the vehicle could depart from the lane. However, it is also possible to adopt a configuration wherein the driver is notified by any one of them, or to employ a configuration wherein the driver is notified by any other method such as output of a voice message. In addition, the present embodiment was configured to notify the driver of incapability of keeping traveling in the lane, by the issue of the buzzer sound and the warning display. However, it is also possible to adopt a configuration wherein the driver is notified by either one of them, or a configuration wherein the driver is notified by any other method such as output of a voice message. It is also possible to adopt a configuration in which with incapability of keeping traveling in the lane, a steering force larger than normal (instead of the relatively small steering force) is added to keep the vehicle traveling within the lane.

The present embodiment was configured to add the steering force to the steering system by use of the electric power steering, but it is also possible to adopt a configuration in which the lane keeping device is provided with an actuator for assisting a rack and a pinion. This configuration permits the present invention to be applied to vehicles without the power steering system. Besides the electric power steerings, the present invention can also be applied to hydraulic power steerings, and it is possible to adopt a configuration in which the steering force is added to the steering system by controlling an actuator for regulating hydraulic pressure. The apparatus was configured to control the steering torque, but the apparatus may be configured to control another parameter such as a steer angle.

The present embodiment was configured to detect the lane by recognizing a pair of white lines, but the apparatus may also be configured to detect the lane by recognizing other lines such as yellow lines except for the white lines. Another potential configuration is such that the lane is detected by another method, e.g., a method of detecting the lane by recognizing road shoulders, blocks separating the lane from a sidewalk or the like. The present embodiment was the application to the roads with the lane, but the invention can also be applied to roads without the lane. In this case, the lane can be detected by recognizing a road shoulder of the road or the like.

The present embodiment was configured to switch between the lane-keep assist function and the lane departure warning function, based on the determination on the vehicle speed by the activation permitting speed range of the lane-keep assist function, but it is also possible to adopt a configuration wherein switching is effected between the lane-keep assist function and the lane departure warning function, based on only activation/deactivation of the cruise control system, without the determination on the vehicle speed. Furthermore, the present embodiment was configured to determine activation/deactivation of the lane keeping device in combination with the determination on the vehicle speed by the activation permitting speed range of the lane departure warning function, but it is also possible to adopt a configuration wherein activation/deactivation of the lane keeping device is determined based on only on/off of the lane keep switch, without the determination on the vehicle speed.

What is claimed is:

1. A driving control apparatus comprising:

driving road keeping means for providing a torque to a steering mechanism so as to keep a vehicle traveling at a predetermined position on a driving road;

driving road departure warning means for providing a warning of a departure from the driving road on the basis of a position of the vehicle relative to the driving road; and setting means for setting a need or no need for execution of a control of the driving road keeping means or the driving road departure warning means, wherein in a case where the setting means sets a need for execution of the control, the control of the driving road keeping means is executed when (1) an activation condition of the driving road keeping means is met and when (2) cruise control means for controlling a driving force or speed of the vehicle so as to keep the vehicle in a predetermined driving state is active;

wherein in a case where the setting means sets a need for execution of the control, the control of the driving road departure warning means is executed when an activation condition of the driving road warning means is met and when (1) the activation condition of the driving road keeping means is not met or when (2) the cruise control means is inactive, wherein the activation condition of the driving road keeping means is whether the vehicle speed is within an activation speed region of the driving road keeping means, such that the activation condition of the driving road keeping means is met when the vehicle speed is within the activation speed region of the driving road keeping means, and the activation condition of the driving road keeping means is not met when the vehicle speed is not within the activation speed region of the driving road keeping means, wherein the activation condition of the driving road departure warning means is whether the vehicle speed is within an activation speed region of the driving road departure warning means, such that the activation condition of the driving road departure warning means is met when the vehicle speed is within the activation speed region of the driving road departure warning means, and the activation condition of the driving road departure warning means is not met when the vehicle speed is not within the activation speed region of the driving road departure warning means, wherein the activation speed region of the driving road departure warning means is wider than the activation speed region of the driving road keeping means, and wherein in a case where (1) the setting means sets a need for execution of the control and (2) the vehicle speed is within the activation speed region of the driving road departure warning means, the execution of the driving road keeping means and the driving road departure warning means is automatically switched from one to the other based on whether the vehicle speed is within the activation speed region of the driving road keeping means and whether the cruise control means is active.

2. The driving control apparatus according to claim 1, wherein an occasion in which the cruise control means is inactive is an occasion in which a setting switch for setting a need or no need for activation of the cruise control means is off.

3. The driving control apparatus according to claim 1, wherein an occasion in which the cruise control means is inactive is an occasion in which a target speed of the cruise control means is off an activation speed region.

* * * * *